Sept. 28, 1926.
E. R. WOLCOTT
TREATING HYDROCARBON OILS
Filed Oct. 1, 1924
1,601,421
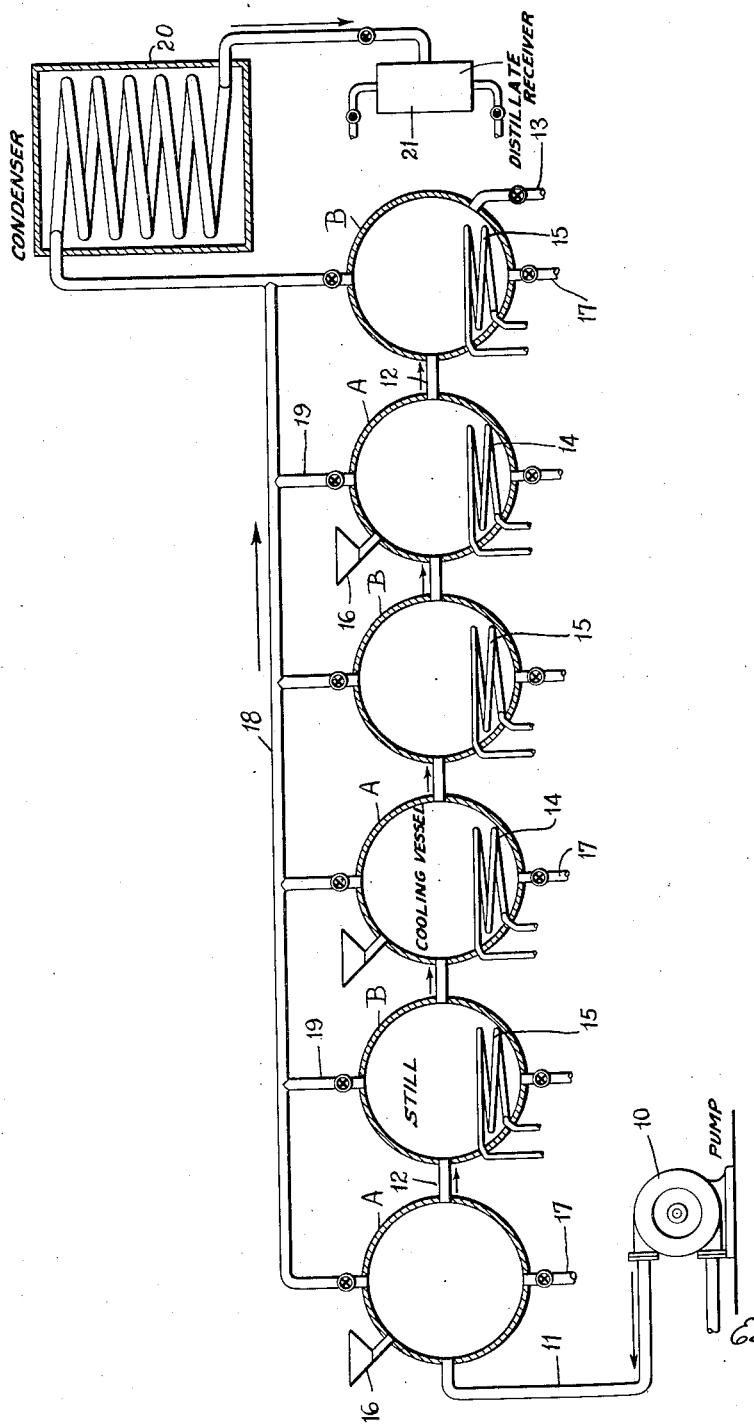
Edson R. Wolcott
Inventor
By his Attorney P. J. Dearborn Patented Sept. 28, 1926.

1,601,421

UNITED STATES PATENT OFFICE.

EDSON R. WOLCOTT, OF LOS ANGELES, CALIFORNIA, ASSIGNOR TO THE TEXAS COMPANY, OF NEW YORK, N. Y., A CORPORATION OF TEXAS.

TREATING HYDROCARBON OILS.

Application filed October 1, 1924. Serial No. 740,902.

This invention relates to improvements in that method of treating hydrocarbon oils in which aluminum chlorid is employed as a treating or conversion agent. The invention has particular reference to the conversion of higher boiling hydrocarbons into lower boilings ones for the production of gasoline and other similar products.

Anhydrous aluminum chlorid may exist either as $AlCl_3$ or $Al_2Cl_6$, the exact state depending upon the temperature. Thus the chlorid is in the form of $Al_2Cl_6$ at lower temperatures and exists as $AlCl_3$ at higher temperatures. While the exact reaction occurring between aluminum chlorid and hydrocarbons in the conversion of the latter into lower boiling products is not definitely known it is believed that what occurs is that at the lower temperatures the aluminum chlorid forms a compound with hydrocarbons which is decomposed at higher temperatures to yield lower boiling hydrocarbons. Thus when the chlorid is admixed with hydrocarbons, such as petroleum hydrocarbons, at the lower temperatures a compound such for example, as $C_nH_{2n}Al_2Cl_6$ is formed. When this compound is subjected to higher temperatures it is decomposed to form, for example, $2(C_nH_{\frac{n}{2}} + AlCl_3)$.

It is apparent that if the chlorid be added to the oil at the higher temperatures, for example, when it is in the form of $AlCl_3$, its effectiveness as a conversion inducing agent is lost. In the practice of my invention the aluminum chlorid is added to the oil at a relatively low temperature after which heat is applied to the mixture or compound of oil and hydrocarbons resulting in the decomposition or disassociation of the compounds and the production of lower boiling hydrocarbons. In the preferred method of operation a body of oil is subjected to alternate periods of heating and cooling and the aluminum chlorid is added after the cooling stages or prior to the heating stages.

Various types of apparatus may be employed in the practice of the invention. Thus a still may be equipped with both heating and cooling means which means may assume the form of heating and cooling coils. Perhaps the best arrangement is to provide a series or battery of stills, alternate stills having heating means and the intervening stills having suitable cooling equipment. Thus the oil to be treated may be charged into the first still and contacted with aluminum chlorid at a relatively low temperature, heated in the succeeding still to produce vapors and cooled in the next still wherein more aluminum chlorid is added, etc.

The accompanying drawings shows in diagrammatic sectional elevation a battery of stills arranged and adapted for practicing the invention. The battery comprises a plurality of cooling vessels A and a plurality of heating vessels or stills B with the cooling and heating vessels arranged alternately, as illustrated. A pump 10 with a charging line 11 is provided for admitting the oil to the first vessel A, and the several vessels A and B are interconnected by pipes 12 so that the oil will overflow from one vessel to another in succession. The last vessel in the battery is preferably equipped with a pipe 13 for drawing off liquid oil. The cooling vessels A are equipped with cooling coils 14 and the heating vessels are provided with heating coils 15 or otherwise arranged to be supplied with heat. The first vessel A of the battery need not necessarily be supplied with either heating or cooling coils, since it is generally convenient to supply oil to this vessel at normal temperatures. Suitable pipes or hoppers 16 are provided for admitting aluminum chlorid or a mixture or compound of aluminum chlorid and oil to the several vessels A. Each of the vessels is preferably provided with a draw-off line 17 for removing spent aluminum chlorid sludge material. A vapor line 18 having valved branch lines 19 to the several vessels of the battery is provided for withdrawing vapors. The line 18 extends to a condenser 20, provided with a distillate receiver 21, or to such fractionating and condensing equipment as may be desired.

In practicing the invention with the apparatus illustrated the oil to be treated is introduced into the first still A preferably at normal temperatures. Here the oil is contacted with aluminum chlorid or aluminum chlorid hydrocarbon compound or mixture admitted through the pipe or hopper 16. The resulting mixture of oil and aluminum chlorid material flows into the second vessel of the battery viz., the heating still B, wherein the mixture is subjected to heat with resultant decomposition and formation of lower boiling hydrocarbons. The spent aluminum chlorid sludge material may be drawn off from the bottom of the still through the pipe 17. The unconverted oil passes to the next vessel A wherein it is cooled and fresh aluminum chlorid material admitted through the device 16. The liquid oil is then passed to the other vessels in succession, being subjected to alternate heating and cooling and fresh chlorid being added in the cooling stage. The evolved vapors are removed from the several stills B by the vapor lines 19 and 18. The valves in the lines 19 communicating with the vessels A are normally closed since usually there is little or no vaporization in these vessels.

Although the preferred embodiment of the invention has been set forth in connection with apparatus having a particular construction and arrangement of parts and mode of operation, it is obvious that various changes and modifications may be made therein, while securing to a greater or less extent some or all of the benefits of the invention, without departing from the spirit and scope thereof. Therefore, only such limitations should be imposed as are indicated in the appended claim.

What I claim is:

The process of treating hydrocarbon oils that comprises continuously passing the oil through a series of pools, heating and cooling alternate pools, introducing aluminum chlorid material to the cooled pools and removing and condensing vapors generated from the heated pools.

In witness whereof I have hereunto set my hand this 10th day of September, 1924.

EDSON R. WOLCOTT.